Figure 1:
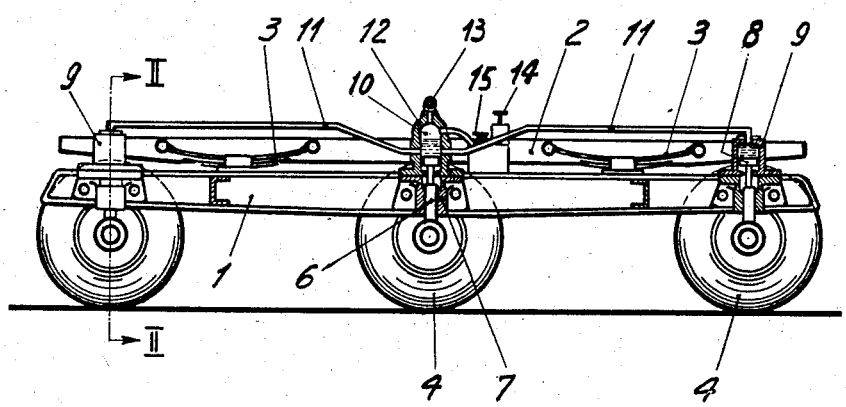

Patented Feb. 17, 1931

1,792,794

UNITED STATES PATENT OFFICE

HEINRICH ZOELLY, OF ZURICH, SWITZERLAND

POWER VEHICLE WITH TWO MUTUALLY-SPRUNG FRAMES

Application filed July 16, 1928, Serial No. 293,053, and in Switzerland July 18, 1927.

This invention relates to a power vehicle with two mutually suspended frames, one of which is fitted with at least six wheels, which are prevented by fixed stops from sinking into depressions but are so mounted that they can yield freely in the upward direction.

In vehicles of this kind, having two mutually suspended frames of which the lower one is ordinarily light and of slender dimensions, while the upper one carries the driving motor and the body of the vehicle, and is therefore heavy, it is important that the upper frame shall remain as much as possible in a horizontal position when the vehicle is in motion, that is to say, shall follow as little as possible the movements of the lower, lighter frame and shall not be exposed to any severe jolts and concussions which would be transmitted directly to the occupants of the vehicle. The mounting of the wheels in such vehicles must, however, as a rule, be made fairly stiff because, if it is not, the wheels, notwithstanding the provision of fixed stops which prevent them from sinking below a certain level may still drop to some extent into the depressions encountered by the vehicle. The reason for this is that the weak springs associated with the other wheels are so greatly compressed, owing to the greater load falling on them all, that the wheels suspended above the depressions and carrying no load are forced down into the said depressions, and when these wheels strike the ground again severe shocks result. The spring mounting provided between the two frames must, on the other hand, be soft. It is important that the stiffness of the two systems of suspension may be brought into a definite relationship with each other. According to the present invention this object is achieved by interposing between the wheels and the frame of the vehicle, that is to say, the lower frame thereof, an adjustable, hydraulic-pneumatic suspension.

In connection with power vehicles it is already known to provide hydraulic-pneumatic spring devices and also to put all the liquid chambers of such spring devices into communication with each other and with an air vessel. The object of the arrangements hitherto known is, however, merely to provide a suspension, which is sufficiently soft to prevent the wheel axles from striking against the frame of the vehicle even when subjected to the most severe jolting. On the contrary, the object of the arrangement according to the present invention is, essentially, to obtain, by interposing adjustable hydraulic-pneumatic suspension between the wheels and the frame of the vehicle, the most favorable relationship of the suspension between the wheels and the vehicle frame to the springing between the two frames, so that under all road conditions and under all loads the upper frame of the vehicle is maintained, as far as possible, in a horizontal plane, thus eliminating severe shocks and concussions and ensuring steady and smooth running.

Figure 2:
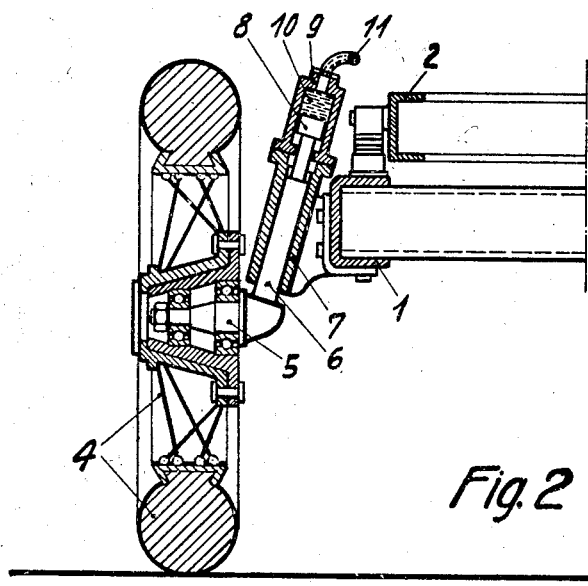

Examples of constructions according to the invention are shown diagrammatically in the accompanying drawing, in which Fig. 1 is a side elevation of a power vehicle, in which the body of the vehicle is omitted for the sake of clearness, and Fig. 2 is a section on the line II—II of Fig. 1 and is drawn to a larger scale, the upper frame being omitted in this view.

Figures 3, 4:
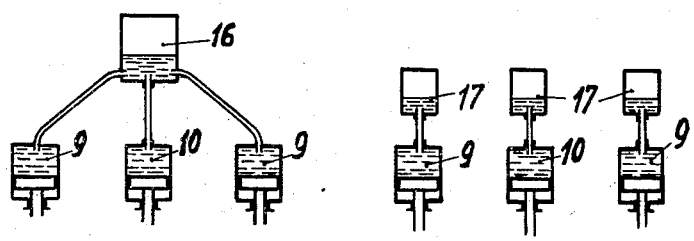

Figs. 3 and 4 show modifications of details.

The numeral 1 designates the lower frame hereinafter called the "vehicle frame" and 2 is the upper frame. These two frames are mutually suspended in a vertical direction by springs 3. The vehicle is provided with six wheels, of which only three are visible in Fig. 1, and each wheel is mounted on a separate stub-axle 5 (see Fig. 2) which is connected to a rod 6 slidably mounted in a guide 7. To each rod 6 is rigidly connected a piston 8 which is adapted to work in a corresponding cylinder 9 or 12. The space 10 between the piston 8 and the upper wall of the cylinder is completely filled with liquid in the case of the cylinders 9 mounted at both ends of the vehicle, but in the case of the cylinders 12 mounted in the middle of the vehicle the said space 10 is filled partially with liquid and partially with compressed air. The space which is filled with air acts as an air vessel. The spaces in the two cylinders 12 which are filled with compressed air are connected together by a pipe 13. The chambers for liquid in the cylinders 9 and 12 respectively situated on the same side of the vehicle communicate with each other by pipes 11. Thus, in the construction above described, there is provided in conjunction with each wheel 4, a separate hydraulic-pneumatic suspension in which over all the pistons 8, there is a film of liquid which ensures their satisfactory lubrication and on which the air pressure present in the spaces which serve as air vessels acts. This air pressure can be readily and rapidly varied by means of a pumping device 14 or a blow-off valve 15, so that the stiffness of the hydraulic-pneumatic suspension devices (designated by the numerals 8 to 12) interposed between the wheels 4 and the frame 1 of the vehicle can be adjusted according to the requirements. From what has been said it follows that the aforesaid hydraulic-pneumatic suspension devices 8 to 12 can, by varying the air pressure in the air vessel, be brought into any desired relationship to the stiffness of the springs 3, which contributes very materially to satisfactory riding of the vehicle, since the vehicle body can be substantially insulated from the vibrations of the light vehicle frame 1.

If desired the spaces 10 in all the cylinders 9 and 12, may, as shown in Fig. 3, be entirely filled with liquid and may be connected to a single separate air vessel 16. A number of separate air vessels 17 may however also be provided, as shown in Fig. 4.

I claim:

1. A power vehicle, comprising in combination, two mutually spring supported frames arranged one above the other, at least six wheels, and means to fit said wheels to the lower of said frames, which means include fixed stops adapted to prevent said wheels from falling into depressions in the road and hydraulic-pneumatic springs to permit said wheels to yield resiliently upwards, when travelling over rising parts in the road.

2. A power vehicle, comprising in combination, two mutually spring mounted frames arranged one above the other, at least six wheels, means to fit said wheels to the lower of said frames, which means include fixed stops adapted to prevent said wheels from falling into depressions in the road and hydraulic-pneumatic springs to permit said wheels to yield resiliently upwards when travelling over rising parts in the road, and means to adjust said hydraulic springs.

3. A power vehicle, comprising in combination, two mutually spring supported frames arranged one above the other, at least six wheels, means for rotatably mounting every wheel, a guide for said means fixed to the lower frame and permitting an upward and downward movement of said wheels, stop means to prevent said wheels from falling into depressions in the road, and hydraulic-pneumatic spring means to permit said wheels to yield resiliently upwards when travelling over rising parts in the road.

4. A power vehicle, comprising in combination, two mutually supported frames arranged one above the other, at least six wheels, a stub-axle for every wheel, a rod to which said stub-axle is connected, guide means for said rod, said guide means being rigidly fixed to the lower frame, and a piston rigidly fixed to said rod, a cylinder rigidly fixed to said lower frame for housing said piston and having a liquid column above said piston and a pneumatic column above the liquid column to provide a hydraulic-pneumatic spring permitting said wheels to yield resiliently upwards when travelling over rising parts in the road, said piston and cylinder forming a stop which prevents the wheel from falling into depressions in the road.

5. A power vehicle, comprising in combination two mutually supported frames arranged one above the other, at least six wheels, means to fit said wheels to the lower of said frames, which means includes a piston in connection with every wheel, each of said pistons being rigidly connected to the axle of the associated wheel, cylinders rigidly fixed to said lower frame and each housing one of said pistons, a liquid column above each of said pistons, an air space provided on each side of the vehicle in one of the cylinders above the liquid column, means connecting the two air spaces disposed on different sides of the vehicle, and means for varying the air pressure in said air spaces.

6. A wheeled power vehicle comprising in combination a lower frame, hydraulic-pneumatic spring means to suspend said frame on the wheels, an auxiliary frame heavier than the aforesaid frame, springs between the frames less stiff than said spring means, and means to adjust the stiffness of said spring means relatively to said springs.

7. In a power vehicle, a lower frame, an upper frame of greater weight than the lower frame, springs between the upper and lower frames, at least six wheels, means to fit said wheels to the lower lighter frame and including fixed stops to prevent said wheels from dropping into depressions in the road, and hydraulic pneumatic springs to permit said wheels to yield upwardly with respect to the lower, lighter frame when travelling over rising parts in the road.

8. In a power vehicle, a lower frame, an upper frame heavier and stiffer than the lower frame, springs between the upper and lower frames, at least six wheels, means to fit said wheels to the lower, lighter frame and including fixed stops to prevent said wheels from dropping into depressions in the road, and adjustable hydro-pneumatic springs stiffer than the springs between said wheels and lower lighter frame, to permit said wheels to yield upwardly.

In testimony whereof I have signed my name to this specification.

HEINRICH ZOELLY.